United States Patent [19]
Masuda et al.

[11] 3,900,579
[45] Aug. 19, 1975

[54] LOW-TEMPERATURE-PULVERIZED ANIMAL FOODS

[75] Inventors: Yoshikazu Masuda, Kobe; Tatsumi Inagaki, Kyoto, both of Japan

[73] Assignee: Sun Spice Co., Ltd., Japan

[22] Filed: Aug. 20, 1973

[21] Appl. No.: 389,991

[30] Foreign Application Priority Data
Aug. 22, 1972 Japan................................ 47-83889

[52] U.S. Cl. ............... 426/388; 426/641; 426/645; 426/518; 426/524; 426/805; 426/646
[51] Int. Cl.² ............................................ A23L 1/31
[58] Field of Search .......... 426/807, 805, 149, 518, 426/388, 524, 148; 71/19, 20

[56] References Cited
UNITED STATES PATENTS

| | | | |
|---|---|---|---|
| 2,622,027 | 12/1952 | Torr | 426/518 |
| 2,752,252 | 6/1956 | Condon | 426/518 |
| 3,032,415 | 5/1962 | Werblud | 426/524 |
| 3,151,991 | 10/1964 | Evans | 426/524 |

*Primary Examiner*—Samih N. Zaharna
*Assistant Examiner*—Ernest G. Therkorn
*Attorney, Agent, or Firm*—Armstrong, Nikaido & Wegner

[57] ABSTRACT

A nutritious powdery animal food is obtained by cooling to a temperature below 0°C, preferably in the range of from −20° to −120°C, a poultry carcass of, for example, chicken, turkey, duck, domestic duck, pheasant, quail, etc., or the part remaining after the removal of fleshy edible portions and containing a large quantity of cartilage, of domestic animals, for example, cattle, horses, hogs, goats, rabbit, etc., and then pulverizing the cooled carcass at said temperature.

12 Claims, No Drawings

LOW-TEMPERATURE-PULVERIZED ANIMAL FOODS

This invention relates to a powdery animal food obtained by pulverizing at a temperature as low as below 0°C a carcass of poultry or animal, particularly the part remaining after the removal of fleshy edible portions and containing a large quantity of cartilage.

Generally, a carcass of poultry and the part of domestic animal remaining after the removal of fleshy edible portions are perishable and substantially useless or extremely low in value for edible meat dealers, and much labor and a high cost have heretofore been required for the disposal thereof. For example, a large dealer of broilers obtains several tons per day of chicken bones, but the said bones have not been utilized, except for the production of feeds for hogs by boiling or the recovery of fats and extracts by boiling with water, and it is at this stage that the dealer has trouble on account of the disposal of said bones. However, the bones of chickens and the useless portions of domestic animals have considerably high nutritive values such that palatable and nutritious broths can be obtained by the processing of the chicken bones, and vitamines, calcium components, gelatin, fats, etc. can be recovered from the useless portions of animals. Further, bones of poultry and animal are useful as a calcium source, and the marrow contained therein has a considerably high nutritive value and a special flavor or taste. However, there have been seen no examples in which bones have hygienically been pulverized into food in such a form that the presence of a piece of bone is not noticed. In particular, the materials dealt with in this invention are formed into sharp pieces when pulverized by a conventional method, which may damage digestive organs, and cannot be used as food. If the materials are so sufficiently pulverized as can be used as foods, they are changed in quality by the heat generated by pulverization, and the propagation of saprogenic bacteria is accelerated, whereby the freshness may be lowered so that the pulverized materials are not suitable for use as food.

As the result of extensive research on processing for effective utilization of said nutriments, the present inventors have found that a roughly ground carcass of poultry or roughly ground cartilage of animal, or the part of poultry or animal remaining after the removal of the internal organs, feather or fur, and if necessary, blood, head and feet, which part has been roughly ground, is supplied, as it is or after cooling with a coolant such as dry ice, a fluorinated hydrocarbon or liquid nitrogen, into a pulverizer which has been cooled to a desired temperature with the same coolant and then pulverized therein, whereby all of the bones, cartilages, fleshes adhered to the bones, tendons and fats can be formed into a fine homogeneous powder which, when brought up to ordinary temperature, forms such a paste that on cooking according to a conventional procedure, can be used as a food useful particularly for constitutionally weak persons and for infants at the growth stage.

An object of this invention is to provide a nutritious powdery animal food.

Another object of this invention is to provide a powdery animal food obtained from the carcass of poultry or the cartilages of animals.

A further object of the invention is to provide a process for producing a nutritious powdery animal food from a carcass of poultry or the part of animal remaining after the removal of edible portions which has heretofore been wasted without any substantial utilization.

Other objects and advantages of the invention will become apparent from the description given below.

In accordance with this invention, there is provided a nutritious powdery animal food obtained by pulverizing at a temperature below 0°C, preferably −20° to −120°C at least one material selected from the group consisting of bones, cartilages, flesh-bearing bones, and tendons of poultry or animals, preferably the carcass of poultry or the part of an animal remaining after the removal of the fleshy edible portions.

The food of this invention contains proteins, fats and inorganics in abundance and in a well-balanced state, and hence, is extremely high in nutritive value. Furthermore, the material is processed at a low temperature, below 0°C from the beginning to the end, so that no propagation of saprogenic bacteria is noticed in the course of the process, and hence, the product is very hygienic. Further, the powder as produced is maintained at a low, uniform temperature below 0°C and can immediately be stored in a refrigerator stably.

The composition of the present food is more valuable than the edible portion as shown in Table 1.

TABLE 1

Comparison in constituents in the case of chicken

|  | Edible portion (% by weight) | Carcass (% by weight) |
|---|---|---|
| Water | 72.8 | 67.0 |
| Ash | 1.2 | 5.4 |
| Crude protein | 20.4 | 13.1 |
| Crude fat | 5.6 | 14.5 |
| Carbohydrate | 0 | 0 |
| Total | 100 | 100 |
| pH of 10% aqueous solution of ash | 6.7 | 8.4 |

As shown in Table 1, the carcass has a much higher ash content than the edible portion, and the main factor therefor is an increase in calcium content. Accordingly, the food of this invention is very suitable as foods for infants and constitutionally weak persons. The pH of the aqueous solution of ash is on the acidic side in the case of edible portion and on the alkali side in the case of carcass. This fact means that the flesh is an acidic food and the carcass is an alkaline food. Therefor, the food of this invention is particularly suitable as an alkaline food for middle-aged or older persons. It is emphasized by this fact that the food of this invention is recommended from a dietitic viewpoint.

Starting materials usable in this invention include poultry such as chicken, turkey, duck, domestic duck, quail and pheasant, and domestic animals such as cattle, horses, hogs, goats and rabbit. In the case of poultry, materials which are particularly suitable for use in this invention are the carcass of the poultry, but the whole part of the bird remaining after the removal of feathers, the internal organs, the head and the feet only may also be used as it is. In the case of domestic animals, the part remaining after the removal of the fleshy edible portions and containing a large quantity of cartilage e.g., ribs, joints and hoofs, which may have not completely been freed from flesh and fats, are preferable, but the part of the animal remaining after the removal of merely fur, head and feet may also be used as in the case of poultry. Further, the carcass of poultry and that of animal may be used in combination. For example, when 1 part by weight of the carcass of chicken is used together with 2 parts by weight of ribs of hog, the product is very like pork in taste.

For cooling the starting material, a coolant such as dry ice, a fluorinated hydrocarbon, preferably having 1 or 2 carbon atoms, or liquid nitrogen may be used. The cooling temperature is below 0°C, preferably from −20° to −120°C, but may be varied in consideration of the following matters:

1. Materials having a small flesh, fat and cartilage content: 0° to −30°C
2. Materials having a considerable flesh, fat and cartilage content: −30° to −80°C
3. Materials having a particularly large flesh, fat and cartilage content: below −80°C Any of dry ice, a fluorinated hydrocarbon and liquid nitrogen may be used for cooling the material down to about −10°C, but fluorinated hydrocarbon or liquid nitrogen should be used for cooling below −10°C.

For the production of the powdery food of the present invention, it is preferable to use a pulverizer capable of satisfying the following conditions:

a. The pulverizer should be made of stainless steel or the like material, which can sufficiently withstand the temperature of liquid nitrogen (−196°C).
b. The pulverizer should be one which can pulverize the starting material without exposing the same to the open air.
c. The pulverizer should be quick in processing and able to be operated in a continuous manner.

An example of a pulverizer satisfying the abovementioned conditions has such a construction as described below.

The pulverizer is composed of a stainless steel-made cylindrical pulverization chamber having a volume of about 50 liters; a shaft having several rotors which penetrates through the center of the cylindrical pulverization chamber, the distance between the tip of each rotor and the pulverization chamber wall being 5 to 10 mm; and a motor equipped with a rotation-controlling means which is connected by means of a belt to one end of the shaft, wherein the rotors can be properly exchanged and increased or decreased in number as occasion demands, and on one side the pulverization chamber is provided with a material-charging inlet while the other side is equipped with a large-diameter pipe to be connected to a receiving vessel.

When the starting material is subjected to low temperature processing by use of such a pulverizer as mentioned above, a powdery product can be obtained in a short period of time. When the product is required to be regulated in granular size, the number of rotors, the revolution of rotors (ordinarily 3,000 to 5,000 r.p.m.), and the distance between the rotors and the pulverization chamber wall may be properly controlled.

The present invention is further explained in detail below with reference to examples, but the examples are by way of illustration and not by way of limitation.

EXAMPLE 1

The pulverization chamber of the abovementioned pulverizer equipped with 4 rotors distanced by 10 mm from the pulverization chamber wall, which rotors had been controlled so as to rotate at 5,000 r.p.m., was cooled to −50°C by injection of liquid nitrogen. A material, which had been prepared by roughly grinding 100 kg of chicken carcass to cubic grains of about 1 cm in side, was charged through the inlet into the pulverizer at a rate of about 10 kg per minute, whereby the pulverized material was lifted up by means of the pressure of nitrogen gas formed by gasification of the liquid nitrogen, and accumulated in the receiving vessel. The operation was completed in about 12 minutes to obtain 99 kg of a powdery animal food of about 60 mesh. The thus obtained powdery food contained 67.0% by weight of water, 5.4% by weight of ash, 13.1% by weight of crude protein and 14.5% by weight of crude fat.

Note: A carcass of poultry other than chicken can also be processed in the same manner as above to obtain a powdery animal food. However, in the case of a material containing large amounts of feathers or containing hard bones, the processing treatment should be carried out after cooling the material by immersing in or spraying liquid nitrogen or a fluorinated hydrocarbon. In the case of a material composed of bones bearing large quantities of flesh and fat, the processing treatment should be conducted after cooling the pulverization chamber of the pulverizer to −100°C or below.

EXAMPLE 2

The pulverization chamber of the abovementioned pulverizer equipped with 2 rotors, one distanced by 10 mm and the other distanced by 5 mm from the pulverization chamber wall, which rotors had been controlled so as to rotate at 3,500 r.p.m., was cooled to −120°C by injection of liquid nitrogen. A material, which had been prepared by roughly grinding 50 kg of ribs of hogs to cubic grains of about 1 cm in side, was charged through the inlet into the pulverizer at a rate of about 7 kg per minute, whereby the pulverized material was accumulated in the receiving vessel in the same manner as in Example 1. The operation was completed in about 10 minutes to obtain 49 kg of a powdery animal food of about 80 mesh.

Note: A material composed of the parts of cattle, horses, or like edible animals remaining after the removal of fleshy edible portions can also be processed in substantially the same manner as above to obtain a powdery animal food. However, in the case of a material containing hard bones, the processing treatment should be carried out after cooling the material by immersing in or spraying a fluorinated hydrocarbon or liquid nitrogen. In the case of a material composed of the part bearing a small amount of flesh and fat, the processing treatment should be conducted after controlling the cooling temperature of the pulverization chamber of the pulverizer to −40° to −80°C.

EXAMPLE 3

50 kg of rabbit from which the skin and the internal organs had been removed was roughly ground to cubic grains of 1 cm in side, and was cooled to a temperature of −50° to −60°C by the spraying on of liquid nitrogen, and then supplied at a rate of 10 to 12 kg/min into the same pulverizer as in Example 1, which had been cooled to a temperature of −80° to −100°C by injecting a fluorinated hydrocarbon of the formula $CCl_2F_2$, and pulverized at said temperature. The pulverized product was accumulated in the receiving vessel. The operation was completed in about 6 min to obtain 48 kg of a powder of about 100 mesh.

EXAMPLE 4

80 Kg of the ribs of cattle were roughly ground into cubic grains of about 1 cm in side and then immersed in liquid nitrogen, and then supplied at a rate of 7 to 9 kg/min into the same pulverizer as in Example 1 having 4 rotors, the distance between the tip of the rotors and the pulverization chamber wall being 5 mm, the revolution of the rotors being 3,500/min, which pulverizer had been cooled to about −120°C by injecting liquid nitrogen thereinto. The pulverized product was accumulated in the receiving vessel. The operation was completed in about 12 min to obtain 78 kg of a powder having a particle size of about 100 mesh.

EXAMPLE 5

30 Kg of chicken carcass and 60 kg of ribs of hog were separately ground to cubic grains of about 1 cm in side and then mixed, and the resulting mixture was sprayed with a fluorinated hydrocarbon of the formula $CHClF_2$ to cool the mixture. The same pulverizer as in Example 1 was cooled to a temperature of about $-100°C$ by injecting liquid nitrogen thereinto. At that temperature, the mixture was supplied at a rate of about 10 to 12 kg/min into the pulverizer and pulverized therein. The pulverized product was accumulated in the receiving vessel. The operation was completed in about 10 min to obtain 85 kg of a powder of about 100 mesh.

EXAMPLE 6

100 Kg of chicken from which the feathers and the internal organs had been removed was roughly ground to cubic grains of 1 cm in side, and cooled to a temperature below 0°C by injection of liquid nitrogen during the grinding. The thus ground grains were cooled to about $-70°C$ by spraying liquid nitrogen on the grains, and pulverized by means of the same pulverizer as in Example 1 under the same pulverizing conditions, except that the pulverization chamber was cooled to about $-100°C$ by means of liquid nitrogen. The operation was completed in about 13 min to obtain 97 kg of a powder of about 100 mesh in the receiving vessel.

What is claimed is:

1. A nutritious hygenic powdery animal food suitable for human consumption which is obtained without noticeable propagation of saprogenic bacteria by pulverising to a fine powder at a temperature of $-20°$ to $-120°C$ at least one material selected from the group consisting of bones, cartilage portions, tendons and flesh-bearing bones of animals.

2. The food oc claim 1, wherein the animal is poultry.

3. A food according to claim 1, wherein the material is the parts of an animal remaining after the removal of fleshy edible portions and containing a large quantity of cartilage.

4. A food according to claim 1, wherein the poultry is chicken.

5. A food according to claim 1, wherein the animal is hog.

6. A food according to claim 1, wherein the material is the part of rabbit remaining after the removal of the internal organs and the skin.

7. A food according to claim 1, wherein the material is the ribs of cattle.

8. A food according to claim 1, wherein the material is the whole part of chicken remaining after the removal of the feathers and the internal organs.

9. A food according to claim 1, wherein the material is pulverized without being exposed to air.

10. A process for producing a hygenic powdery animal food suitable for human consumption without noticeable propagation of saprogenic bacteria which comprises pulverising to a fine powder at a temperature of $-20°$ to $-120°C$ at least one material selected from the group consisting of bones, cartilages, tendons and flesh-bearing bones of animals.

11. Process of claim 10, in which the material is pulverized without being exposed to air.

12. Process of claim 10 wherein the animal is poultry.

* * * * *